United States Patent [19]

Dobyns

[11] Patent Number: 4,990,019

[45] Date of Patent: Feb. 5, 1991

[54] GUIDE PIN ASSEMBLY

[75] Inventor: Robert W. Dobyns, Ellicott City, Md.

[73] Assignee: Westinghouse Electric Corp., Pittsburgh, Pa.

[21] Appl. No.: 526,482

[22] Filed: May 21, 1990

[51] Int. Cl.⁵ ............................................. B25G 3/00
[52] U.S. Cl. .................................... 403/13; 403/361; 403/405.1
[58] Field of Search .................. 403/13, 14, 361, 405.1

[56] References Cited

U.S. PATENT DOCUMENTS 4,222,683  9/1980  Schaloske et al. ............... 403/13 X
4,655,641  4/1987  Wexler .............................. 403/13 X Primary Examiner—Andrew V. Kundrat
Attorney, Agent, or Firm—John Williamson

[57] ABSTRACT

A guide pin assembly has a base plate with a first surface from which a guide pin extends. A flexible retaining plate hled by the base plate has a first surface facing and spaced from the first surface of the base plate. A spring member has an elastic portion extending alongside the guide pin from a rotatably retained end portion to a distal end portion. The rotatably retained end portion is in contact with the first surface of the flexible retaining plate and it rotates in response to flexure of the retaining plate.

11 Claims, 2 Drawing Sheets

GUIDE PIN ASSEMBLY

BACKGROUND OF THE INVENTION

The invention relates to a guide pin assembly for mechanically aligning two units which are designed to function together.

Typically, one unit is aligned with another unit by fitting two or more guide pins mounted on the first unit with the bores of guide bushings mounted on the second unit. However, because of routine manufacturing tolerances, which frequently are as broad as possible in order to minimize manufacturing costs, the guide pin diameter or the bore diameter may be slightly undersized or oversized or they may be slightly off-center. Thus, the two units may not easily fit together or may not snugly fit together. In addition, guide pin assemblies are usually not standardized. Thus, otherwise interchangeable units may in fact not be readily substituted for each other because of customized guide pin assembly designs. There are virtually an unlimited number of combination of guide pin diameters and lengths, tip radii, hex size (if not round), thread size and the like.

These alignment difficulties cause considerable losses in time and not insignificant additional costs in installing, removing, testing and replacing packaged units and other articles with their associated equipment. For example, avionics packages, are routinely installed on equipment racks in aircraft, periodically removed and tested on fixtures, and then eventually replaced on the equipment racks. Although such packages are virtually identical from a functional standpoint, it is to be expected that they will be manufactured over the years on different contracts and so the guide pins or guide bushings will be at least slightly different. Thus, it will be difficult, as a practical matter, to have to test and replace at least some packages, if only because guide pin assemblies or adapters may have to be designed and precision machined. In addition, customized test fixtures may be needed to test the different packages that will be employed on different aircraft.

SUMMARY OF THE INVENTION

It is an object of the invention to provide a guide pin assembly for mechanically aligning two units despite routine alignment difficulties due to liberal manufacturing tolerances. It is a further object to provide a universal guide pin assembly which will be readily received in the bores of commonly used guide bushings.

With these objects in view, the invention resides in a guide pin assembly comprising a guide pin extending from the first surface of a base plate. A flexible retaining plate held by the base plate has a first surface which faces and is spaced from the first surface of the base plate. At least one spring member has an elastic portion which extends along the guide pin from a rotatably retained end portion to a distal end portion. The rotatably retained portion contacts the first surface of the flexible retaining plate with rotation of the retained end portion being responsive to flexure of the flexible retaining plate.

Advantageously, when a guide pin assembly embodying the present invention is received in a guide bushing for aligning the two units, the retaining plate is flexibly urged by the guide bushing toward the base plate. The retained end portion of the spring member contacting the first surface of the flexible retaining plate is thereby rotated, which urges its elastic portion into contact with the guide bushing. Thus, the guide pin will compensate for misalignments and has universal application with guide bushings of different designs.

In a preferred embodiment of the present invention, the guide pin assembly is locked into position by the elastically deformed spring member. The mechanical forces between the spring member and the guide bushing are sufficient to overcome the forces urging the flexed retaining plate to its initial unstressed condition.

DESCRIPTION OF THE DRAWINGS

The invention will become more readily apparent from the following description of a preferred embodiment thereof shown, by way of example only, in the accompanying drawings, wherein.

DESCRIPTION OF THE PREFERRED EMBODIMENT

Figure 1:
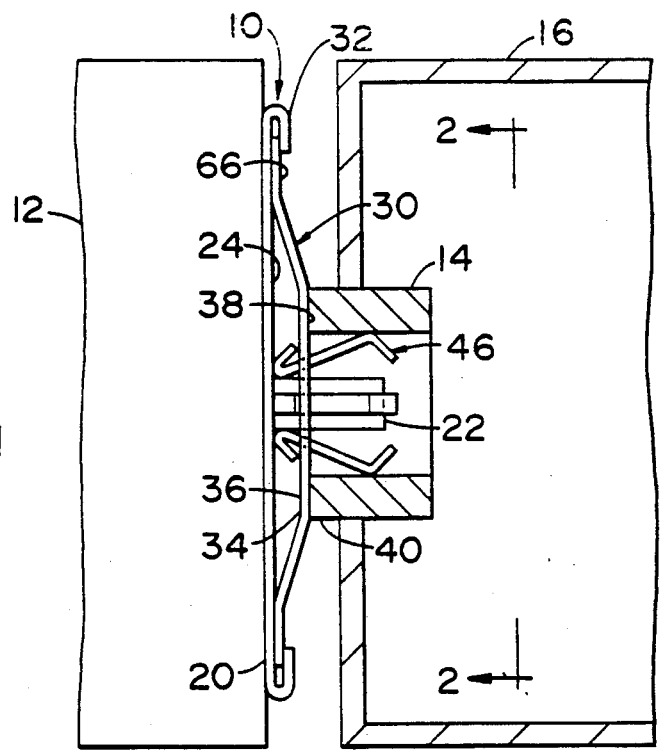
FIG. 1 is a front view of a guide pin assembly embodying the present invention aligned with a guide bushing shown in section for purposes of clarity.
Figure 2:
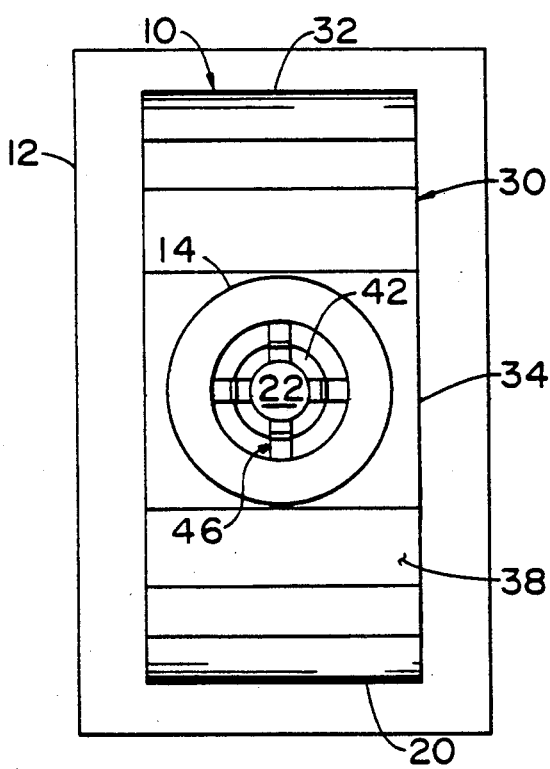
FIG. 2 is a right side view of the guide pin assembly of FIG. 1 generally taken along line 2—2, but with the unit on which the guide bushing is mounted removed for purposes of clarity.
Figure 3:
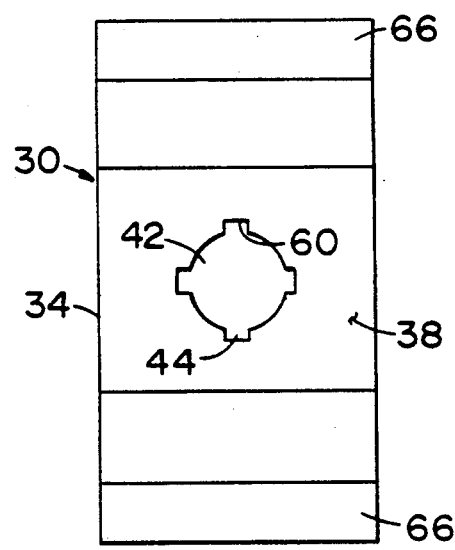
FIG. 3 is a right side view of the flexible retaining plate shown in FIG. 2.
Figure 5:
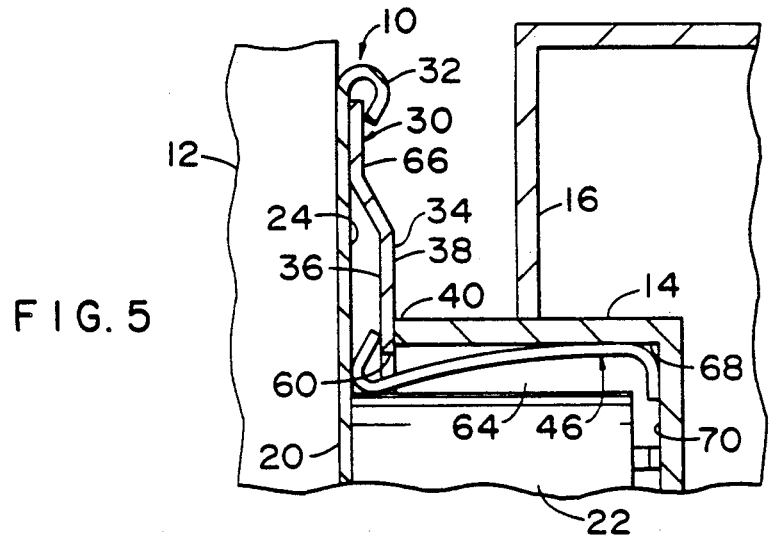
FIG. 5 is an enlarged partial front view of the guide pin assembly of FIG. 1, but showing the guide pin assembly aligned with a guide bushing having a closed end.
Figure 6:
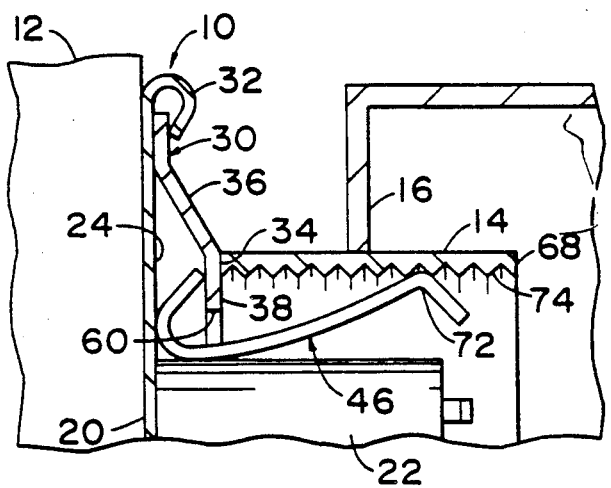
FIG. 6 is an enlarged partial front view of the guide pin assembly of FIG. 1, but showing the guide pin assembly aligned with a guide bushing having internal threads.

FIG. 1 generally shows a guide pin assembly 10 embodying the present invention mounted on a first unit 12, which is aligned with a guide bushing 14 mounted on a second unit 16. The first unit 12 may, e.g., form part of an equipment rack, a test fixture or a functional article. The second unit 16 may be a functional article which is to be employed with the first unit 12. The guide bushing 14 may be closed (FIG. 5) or internally threaded (FIG. 6). In addition, a unit housing may not even need a guide bushing to hold a guide pin in some cases.

The guide pin assembly 10 generally includes a base plate 20 with a guide pin 22 extending from a base plate first surface 24. The base plate 20 may be mounted on the one unit 12 via welding, fasteners (not shown) or other suitable means. The guide pin 22 may be punched in or attached to the base plate 20 by any suitable means. A flexible retaining plate 30 is slideably held against the first surface 24 of the base plate by two wrap flanges 32.

The flexible retaining plate 30 has a raised central portion 34, which has a first surface 36 facing and spaced from the first surface 24 of the base plate 20. An opposed second surface 38 is designed to be engaged by the distal end 40 of a guide bushing 14 mounted on the second unit 16. The central portion 34 also has an opening 42 through which the guide pin 22 outwardly extends from the base plate 20. The opening 42 preferably has slots 44 for guiding elongated spring members 46 which extend alongside the guide pin 22.

Each spring member 46 generally has an elastic portion 52 which extends from a rotatably retained end portion 54 to a distal end portion 56. The tip 58 of the retained end portion 54 contacts the first surface 36 of the raised central portion 34 of the flexible retaining plate 30. Flexure of the retaining plate 30 by the guide bushing 14 to the extent shown in FIG. 1, causes the first surface 36 of the retaining plate 30 to move toward the base plate 20, which urges the retained end portion 54 into slideable contact with the first surface 24 of the base plate 20 and the guide pin 22 and rotates the retained end portion and the elastic portion 52, when the two units 12, 16 are aligned. The tip 58 of the rotatably retained end portion 54 may be extended toward the first surface 24 of the base plate 20 for contacting the first surface 24 of the base plate 20 to limit the rotation of the retained end portion 54 and the maximum flexure of the retaining plate 30 For example in some cases, the flexible retaining plate 30 or the spring member 46 may undesirably plastically deform if flexed too far or became fatigued in a vibratory test.

Figure 4:
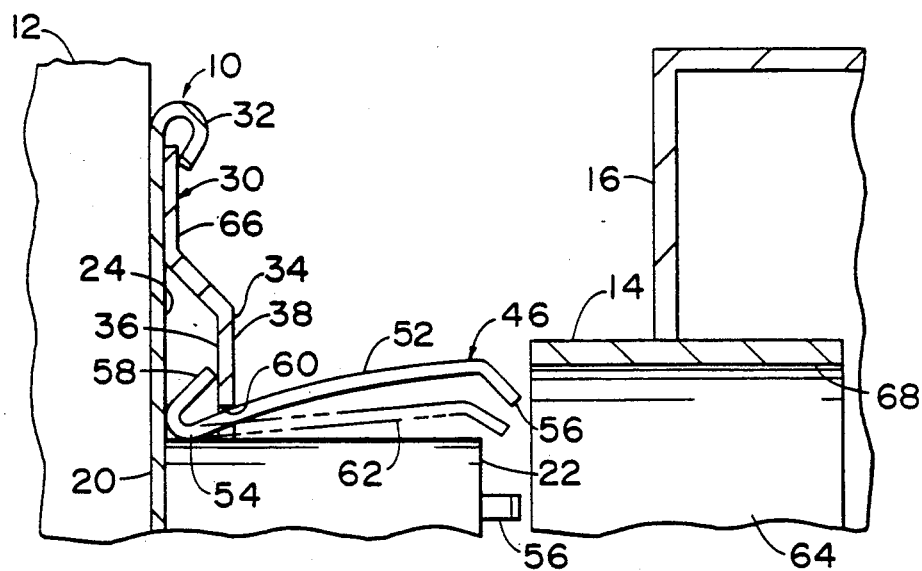
FIG. 4 is an enlarged partial front view of the guide pin assembly of FIG. 1 showing the guide pin assembly, but before alignment with a guide bushing.

As FIG. 4 best shows, each spring member 46 preferably contacts the first surface 36 of the retaining plate 30 and the peripheral edge 60 of the associated slot 44 when the flexible retaining plate is in its initial unstressed condition, so that the spring member 46 is snugly retained. Most preferably, the retained end portion 54 is elastically deformed to at least a slight extent as shown in FIG. 4. The phantom position 62 shown in FIG. 4 illustrates the relative position which the spring member 46 may take, if the retained end portion 54 is only loosely retained by the guide pin assembly 10.

FIG. 4 also shows that before alignment, the distal end portion 56 of each spring member 46 preferably extends beyond the guide pin 22. This extension advantageously provides resiliently yielding initial contact between the two units 12, 16. Also, the distal end portion 56 of each spring member 46 preferably extends inwardly toward the guide pin 22 to facilitate the entry of each spring member 46 into the bore 64 of a guide bushing 14.

With only little required physical effort, the units 12, 16 shown in FIG. 4 may be aligned together. FIGS. 1, 5 and 6 show two aligned units 12, 16 with a guide pin assembly 10 operatively received in a guide bushing 14. The bushing 14 urges the raised central portion 34 toward the base plate 20 and the edges 66 of the retaining plate 30 into the flanges 32. This causes the elastic portion 52 to rotate outwardly toward the guide bushing bore wall 68 where it elastically contacts the guide bushing 14. Preferably, each spring member 46 is made of tempered steel or other suitable material, so that sufficient frictional forces are generated between the spring members 46 and guide bushings 14 to prevent the flexible retaining plate 30 from regaining its initial unstressed shape.

As FIGS. 5 and 6 generally show, the spring members 46 may not contact the peripheral edge 60 of the slots 44 if the spring members 46 are extensively deformed. FIG. 5 also shows that the distal end portions 54 of the spring member 46 may contact rear walls 70 of closed guide bushings 14, which advantageously urge the elastic portions 52 of the spring members 46 into frictional contact with the bore walls 68. FIG. 6 shows that a wedge 72 defined by a juncture of the elastic portion 52 with the distal end portion 56 of each spring member 46 may advantageously engage internal threads 74 in the bore walls 68 of an internally threaded guide bushing 14 for locking the units 12, 16 together with only little elastic deformation.

Generally speaking, there are at least two guide assemblies and cooperating guide bushings associated with each pair of units, such as units 12, 16. Normally, the guide assemblies are identical. Guide assemblies embodying the present invention may in some cases employ one spring member. However, there are preferably at least four spring members associated with each guide pin assembly. In critical applications, there are preferably eight spring members associated with each guide pin assembly.

What is claimed is:
1. A guide pin assembly, comprising:
   a base plate having a first surface;
   a guide pin extending from the first surface;
   a flexible retaining plate held by the baseplate, the retaining plate having a first surface facing and spaced from the first surface of the base plate; and
   at least one spring member having an elastic portion extending alongside the guide pin from a rotatably retained end portion to a distal end portion, where the rotatably retained end portion is maintained in rotatable contact with the base plate by the first surface of the flexible retaining plate and rotation of the retained end portion is caused by flexure of the flexible retaining plate.

2. The guide pin assembly of claim 1, wherein the elastic portion is spaced from the guide pin.

3. The guide pin assembly of claim 1, wherein the flexible retaining plate is slideable held by the base plate.

4. The guide pin assembly of claim 1, wherein the first surface of the flexible retaining plate is moveable toward and away from the first surface of the base plate.

5. The guide pin assembly of claim 1, wherein the rotatably retained end portion of the spring member has a tip which is spaced from the first surface of the base plate.

6. The guide pin assembly of claim 1, wherein the rotatably retained end portion is retained by the flexible retaining plate against the first surface of the base plate and the guide pin.

7. The guide pin assembly of claim wherein the retained end portion is elastically retained when the elastic portion is in its undeformed condition.

8. The guide pin assembly of claim 1, wherein the elastic portion and the distal end portion of the spring member define a wedge.

9. The guide pin assembly of claim wherein the distal end portion of the spring member extends beyond the guide pin.

10. The guide pin assembly of claim 1, wherein the distal end portion of the spring member is elastically deformable.

11. A guide pin assembly, comprising:
    a base plate having a first surface and wrap flanges;
    a guide pin extending from the first surface of the base plate;
    a flexible retaining plate slideably held against the first surface of the base plate by the wrap flanges, the retaining plate having a first surface facing and spaced from the first surface of the base plate, the first surface of the retaining plate having an opening through which the guide pin extends, the first surface of the retaining plate being moveable toward and away from the first surface of the base plate; and a plurality of spring members, each spring member having an elastic portion extending alongside the guidepin from a rotatably retained end portion to a distal end portion, where the rotatably retained end portion is maintained in rotatable contact with the first surface of the base plate and the guidepin by the first surface of the retaining plate and where rotation of the retained end portion is caused by flexure of the retaining plate.

* * * * *